United States Patent
Arvidsson et al.

(10) Patent No.: US 9,713,987 B2
(45) Date of Patent: Jul. 25, 2017

(54) CARRIER BASKET FOR AN AUTOMOTIVE VEHICLE AND A CARRIER BASKET NET

(71) Applicant: Thule Sweden AB, Hillerstorp (SE)

(72) Inventors: Andreas Arvidsson, Sävsjö (SE); Olof Lindholm, Väarnamo (SE); Anders Nilvius, Värnamo (SE); Michael Mitschke, Nürnberg (DE); Olle Claesson, Göteborg (SE); Erik Eliasson, Jönköping (SE); Emil Bromander, Hägersten (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/106,768

(22) PCT Filed: Dec. 23, 2013

(86) PCT No.: PCT/EP2013/077959
§ 371 (c)(1),
(2) Date: Jun. 20, 2016

(87) PCT Pub. No.: WO2015/096860
PCT Pub. Date: Jul. 2, 2015

(65) Prior Publication Data
US 2017/0028931 A1    Feb. 2, 2017

(51) Int. Cl.
*B60R 9/055* (2006.01)
*B60R 9/05* (2006.01)
*B60R 9/048* (2006.01)

(52) U.S. Cl.
CPC .............. *B60R 9/055* (2013.01); *B60R 9/048* (2013.01); *B60R 9/05* (2013.01)

(58) Field of Classification Search
CPC ............ B60R 9/048; B60R 9/055; B60R 9/05
(Continued)

(56) References Cited

U.S. PATENT DOCUMENTS

| 4,433,804 A | 2/1984 | Bott |
| 4,460,116 A * | 7/1984 | Bott ........................ B60R 9/048 224/321 |

(Continued)

FOREIGN PATENT DOCUMENTS

| CA | 2 408 854 | 5/2004 |
| EP | 0 065 218 | 11/1982 |

OTHER PUBLICATIONS

International Search Report and Written Opinion of the International Searching Authority for International Appl. No. PCT/EP2013/077959, European Patent Office, Rijswijk, Netherlands, mailing date of Jul. 25, 2014, 12 pages.

(Continued)

*Primary Examiner* — Corey Skurdal
(74) *Attorney, Agent, or Firm* — Sterne, Kessler, Goldstein & Fox P.L.L.C.

(57) ABSTRACT

A carrier basket for an automotive vehicle is disclosed which includes a base having at least one member for connecting to a roof of an automotive vehicle, a frame having two side rails oriented in a first direction and at least one transverse bar oriented cross to the side rails, wherein the side rails are connected to the at least one transverse bar, wherein the frame is attached to the base as to form a box open to the top, wherein the at least one transverse bar includes a groove arranged for attachment of accessories and having a length, wherein the entire length of the groove is available for attaching accessories, and wherein the groove extends over a substantial portion of the distance between the two side rails.

15 Claims, 15 Drawing Sheets

(58) Field of Classification Search
USPC .................................................. 224/319–326
See application file for complete search history.

(56) References Cited

U.S. PATENT DOCUMENTS

2006/0290154 A1* 12/2006 Stapleton .................. B60R 9/04
                                                         296/3
2008/0272164 A1    11/2008 Wang
2012/0055967 A1     3/2012 McMillan

OTHER PUBLICATIONS

Mitsubishi: "Genuine Accessories", Aug. 1, 2013, pp. 1-4, XP055124913, http://www.mitsubishi-motors.com.au Retrieved from the Internet: URL:http://www.mitsubishi-motors.com.au/image-resize/originals/accessory_images/2014/challenger/challenger-accessories-brochure.pdf [retrieved on Jun. 24, 2014] Figure with the title "THULE Luggage carrier"; p. 3.

* cited by examiner

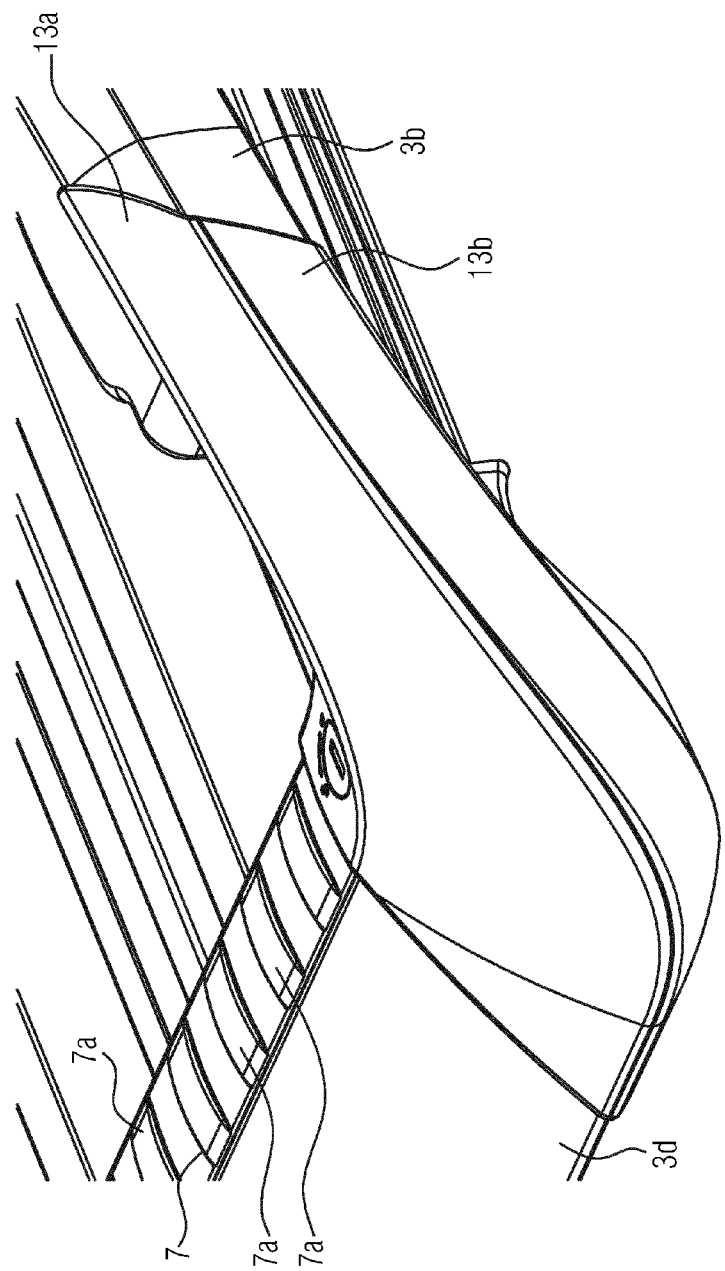

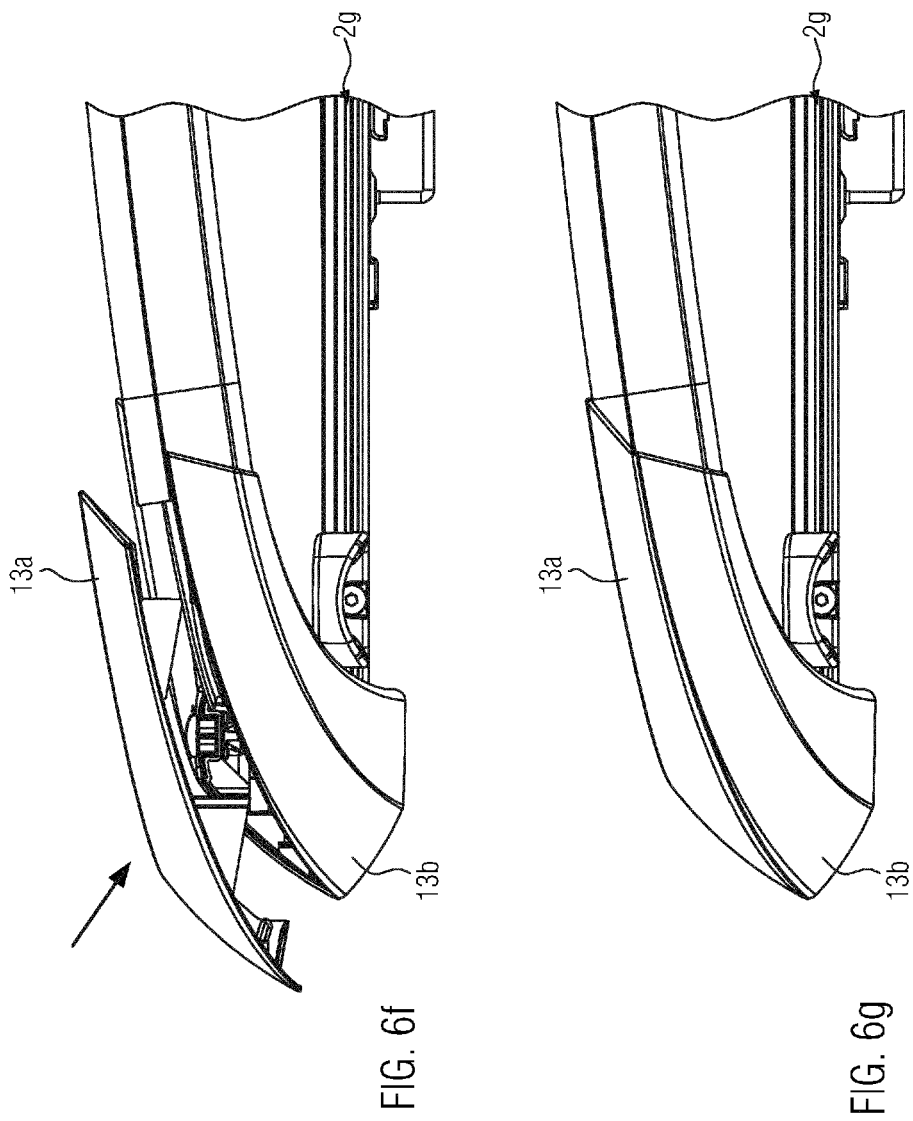

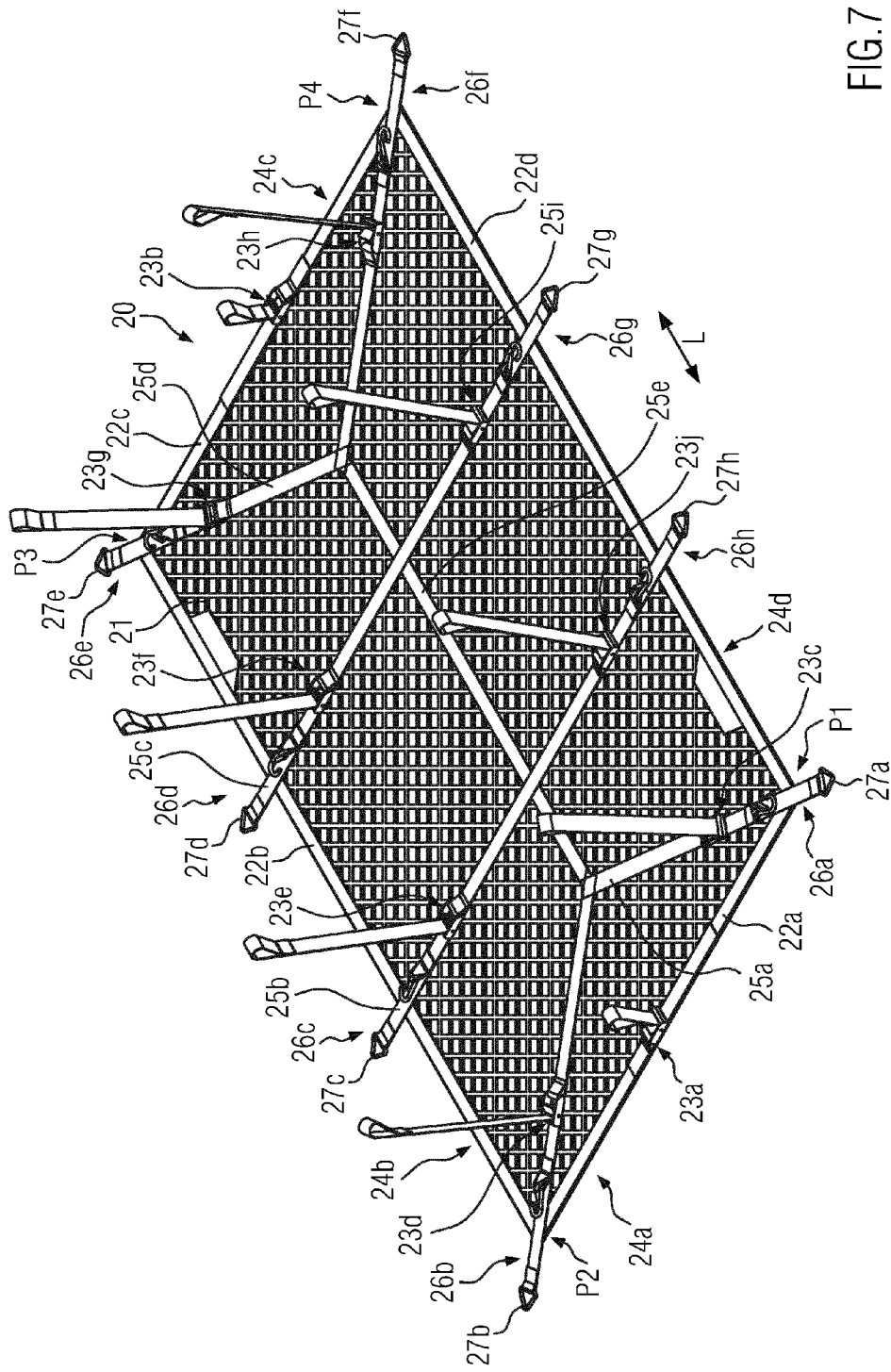

CARRIER BASKET FOR AN AUTOMOTIVE VEHICLE AND A CARRIER BASKET NET

BACKGROUND OF THE DESCRIPTION

The present subject matter relates to a carrier basket for an automotive vehicle and a carrier basket net.

Known carrier baskets comprise a bottom and four sides to form a box open to the top. The bottom and the four sides are formed by profiles, wherein the profiles comprise a linear shape so as to form a bottom and four sides. Two sides are opposite to each other, wherein two of the four sides are directed in a first direction and the two further sides are oriented cross to the first direction in a second direction.

The profiles forming the sides and the bottom are spaced from each other such that a form is obtained similar to a basket. To the profiles being the bottom two cross bars are mounted. Each of these cross bars are connected with two sleeves mounted to the profiles at the bottom. The sleeves encompass the cross bars which are connected to feet mounted to a roof of a vehicle. Thus, the cross bars and the feet form a roof rack.

In case a user of a known carrier basket would like to transport bikes instead of luggage, the user has firstly to dismount an installed carrier basket from the roof of a vehicle. Secondly, the user has to find storage for the basket, and thirdly, has to mount a bike carrier to the roof of the vehicle. Thus, a lot of work has to be done which is very exhausting for the user. Further, for a convenient dismounting of the carrier basket two persons are needful.

Thus, for instance installing a bike carrier on a vehicle's roof on which a carrier basket is mounted a user has to dismount the basket and mount the bike carrier both causing work which is inconvenient, force exerting and time consuming for the user.

Further, known carrier basket nets comprise a mesh having ends for securing e.g. to a carrier basket. These ends are secured to the basket by e.g. a rope. However, adapting the rope and the mesh to a load placed in a basket is time consuming and inconvenient for a user.

Thus, correctly securing a load in a carrier basket installed on a roof is inconvenient for the user due to the height of the carrier basket and the load placed therein. Further, securing a load comprises a lot of work which is also exhausting and force exerting.

SUMMARY

The present subject matter relates to a carrier basket for an automotive vehicle and a carrier basket net.

According to a first aspect of the subject matter, a carrier basket for an automotive vehicle comprises a base having at least one member for connecting to a roof of an automotive vehicle. For instance, such an at least one member can be a cross bar mounted to a roof of a vehicle, wherein the cross bar is preferably held by a foot. The foot and the cross bar can form a roof rack for connecting the base and the carrier basket, respectively.

Further, the carrier basket comprises a frame having to side rails oriented in a first direction and at least one transverse bar oriented cross to the side rails, wherein side rails are connected to the at least one transverse bar, and wherein the frame is attached upon the base as to form a box opened to the top. Thus, by the side rails and by the at least one transverse bar oriented cross to the side rails and connected to each other, respectively, a basket is realizable in which e.g. luggage and sports utilities can be transported.

By this, for instance the luggage is prevented from falling off the roof as the sidewalls and the bottom stabilize each piece of the luggage in its position.

Preferably, the at least one transverse bar comprises a groove arranged for attachment of accessories. Such a groove allows a counterpart adapted to engage the groove to realize a stable and easy connection of e.g. accessory to the frame of a carrier basket. Such an accessory can be a bike carrier or a water sports equipment carrier or ski carrier.

Advantageously, the at least one transverse bar comprises a length, wherein the entire length of the groove is available for attaching accessories. A use of the entire length of the groove allows full adjustability over the length of the groove in any desired position so that a variable adjustment of accessories relative to the at least one transverse bar in the groove is possible.

Preferably, the groove extends over a substantial portion of the distance between the two side rails. Extending over a substantial portion of the distance between the two side rails means that the groove is more than an elongated hole and slotted hole, respectively. Preferably, the groove extends over at least to percent of the length and the distance, respectively, between the two side rails. Further, the groove can also extend over at least to percent of the length of the at least one transverse bar. By this, in the range of to percent of the distance between the two side rails or of the length of the at least one transverse bar, accessories can be mounted to the groove in any desired position within the length of the groove.

Moreover, it is preferred that the groove extends over at least 50 percent of the distance between the two side rails or the length of the at least one transverse bar. This allows a further adjustability of accessories mounted to the groove via a counterpiece and part, respectively, engaging with the groove.

It is also preferred that the groove extends between the two side rails, preferably along the entire length of the at least one transverse bar. Thus, the substantial portion of the distance between the two side rails extends over the whole distance between the two side rails and length of the at least one transverse bar, respectively, as this allows a full adjustability over the whole distance and length, respectively. Further, it is easier to produce a groove in form of a profile as this can be easily e.g. extruded.

According to an embodiment of the present subject matter, the carrier basket further comprises at least one cap for closing an end of the groove. For example, in case the groove extends over the whole length of the transverse bar, each end of the transverse bar comprises a cap which engages the groove. This means, if a counterpiece is inserted into the groove this counterpiece cannot be slit out from the groove at the end of the transverse bar. Moreover, by such a cap the end of the groove is closed, by what stealing of accessories mounted to the carrier basket is prevented.

Preferably, the at least one cap is removably positioned at an end of the least one transverse bar. Thus, an easy and reliable access for a counterpiece guided in the groove is realized as the side and the end of the least one transverse bar, respectively, giving access to the groove is openable or closable. Further, such a removable positioning allows the opening and closing of the groove by the at least one cap, wherein the at least one cap in a removed position grants access to the groove, whereas the at least one cap in an installed position denies access to the groove. Advantageously, the at least one cap comprises a shape adapted for engaging the groove. By this, a form fit is easily realizable, wherein jiggling and a relative movement, respectively, of the at least one cap relative to the at least one transverse bar is prevented.

Further, it is preferred that the at least one cap is slideably mountable into a part of the side rail. Advantageously, the at least one cap comprises two parts, wherein preferably an upper part can be removed and a lower part is fixed. The lower part can be fixed e.g. to a side rail of the frame. Even further, it is preferred that the at least one cap comprises an upper part and a lower part, wherein the upper part is slideably mountable into the lower part, and wherein preferably the lower part is connected to the side rail and/or to the at least one transverse bar. At this, an easy mounting of the at least one cap by sliding into a profile of the side rail or into a lower part of the at least one cap is realizable. Preferably, the sliding movements of the upper part relative to the lower part and the side rail/transverse bar, respectively, can be translational or rotational.

Moreover, it is preferred that the at least one cap comprises an upper and a lower part, wherein the lower part comprises at least one guide having a glide surface. Advantageously, the upper part comprises at least one mating component which is guided by the at least one guide and slides on the glide surface. This enhances the assembling of the upper and the lower part of the at least one cap. It is also possible that the lower part comprises at least one mating component which is guided at least one guide and slides on a glide surface of the upper part.

Further, preferably the at least one guide of the lower part comprises cone-shaped walls and reinforcing rips, respectively. This allows easy catching of the at least one mating component of the upper part. The cone-shaped walls are positioned in the lower part such that they preferably guide the at least one mating component if the at least one mating component is moved translationally, wherein advantageously the cone-shaped walls are oriented to catch the at least one mating component. This means that the cone-shape is mainly oriented in the moving direction of the upper part. Thus, the widest open end of the cone-shape is mainly oriented to the at least one mating component of the upper part to receive at first the at least one mating component. This stabilises the upper part and helps to hold the direction. Further, the at least one mating component of the upper part is guides by the at least one guide and glides, respectively, into a predetermined position relative to the lower part. The above mentioned explanations also apply vice versa for the upper and the lower part which means that preferably at least one guide of the upper part comprises cone-shaped walls and reinforcing rips, respectively.

According to an embodiment of the present subject matter, the at least one cap comprises a lock to lock the at least one cap at an end of the groove. By this, stealing of a counterpiece introduced in the groove and engaging with the groove, respectively, can be prevented. Moreover, it is preferred that the lock comprises a locking cylinder which engages behind a protrusion and wall, respectively, preferably engages with the lower part of the at least one cap which is mounted to a side rail of the frame and to an end of the at least one transverse bar. Thus, the end of the groove and the lock plus the locking cylinder, respectively, prevents removal of counterpieces and parts, respectively, engaged with the groove. In other words, due to the engaging of the lock with the lower part it is not possible for a user to remove the upper part from the lower part as sliding the upper part is prevented.

According to an embodiment of the present subject matter, the carrier basket further comprises a cover, wherein the cover engages the groove for closing the groove of the at least one transverse bar outwardly. By this, the intrusion of e.g. water and dust, respectively, can be prevented as well as the corrosion and demolition, respectively, of the groove. Thus, proper functioning of the groove can be realized over a long time. As the groove is outwardly closed by the cover a smooth surface can be realized in which the groove is closed by the cover.

Preferably, the cover covers substantially a surface of the at least one transverse bar. Thus, it is more difficult for water and dust, respectively, to come to the groove. Hence, the functionality of the groove is preserved over a long time. Advantageously, the cover provides a profile having protrusions for reducing noise of air turbulences. Thus, the drag can be reduced, wherein fuel can be saved.

According to an embodiment of the present subject matter, the groove is a T-track. Such an embodiment allows an easy adaption of further equipment and accessories, respectively, as engaging with the T-track is easily realizable. Engaging the T-track can be easily realized by a counterpiece having a T-screw for example. Thus, an easy and quick engaging of a counterpiece with e.g. the transverse bar is possible.

According to an embodiment of the present subject matter, the side rails and/or the at least one transverse bar and/or the at least one member are made of aluminum, metal, carbon fiber or a compound, preferably of the aforementioned materials. Advantageously, the at least one cap is made of plastic. Thus, depending on the materials the aforementioned parts (side rail; at least one transverse bar; the at least one member) can be used and adapted, respectively, for different application fields and operating conditions.

According to an embodiment of the present subject matter, the groove faces upwards. By this, attaching an accessory into the groove which is placed onto the basket and upon the basket, respectively, is easily possible. Preferably, two grooves of two transverse bars face each other. This has the advantage that an accessory can be hold in place between two opposite transverse bars. Further, an accessory having two counterpieces for the grooves can be engaged in the first groove and in the second groove. This enhances the mechanical stability as a mounting on e.g. two opposite transverse bars is possible.

According to a further embodiment of the present subject matter, the base forms the bottom of a box and the side rails plus the at least one transverse bar build side walls of the box. Such a box is typically open to the top so that accessories can be inserted into a carrier basket similar to a shopping basket, wherein accessories can be hold in place e.g. by engaging with the groove. Further, accessories can be hold by the sidewalls and the bottom as well.

According to an embodiment of the present subject matter, each side rail comprises a further groove. By this, accessories can be hold e.g. by the groove of the at least one transverse bar and/or in the groove of a side rail. Further, having a groove in a transverse bar and a further groove in a side rail, an accessory can be mounted to the aforementioned rail and transverse bar, respectively. By this, an accessory can be placed in an edge of and inside of the carrier basket so as to enhance the mechanical ability for holding such an accessory.

Preferably, the groove of the side rails and the at least one transverse bar are connected. A connection of the grooves allows an easy switching of a counterpiece engaging e.g. in the groove of the at least one transverse bar to the further groove of a side rail. Advantageously, the further groove of each side rail and the groove of the at least one transverse bar are oriented into the center of the carrier basket. By this, accessories placed within the basket can be hold easily in place and secured for driving. Moreover, a placement of a groove facing to the center of the carrier basket can reduce bending moments about the groove as such a groove is mainly stressed with regard to tension and compression.

Moreover, it is also possible that the side rails and the at least one transverse bar comprise each grooves facing to the center of the carrier basket and facing upwards. Thus, each side rail and each transverse bar comprises two grooves. In this context, the two grooves of each component (side rail, transverse bar) can be connected to the corresponding grooves of the adjacent component (transverse bar, side rail). Thus, grooves are obtained circulating on the inside of the sidewalls and the frame, respectively, and circulating on the upside of the frame. Upside means that the grooves face upwards.

According to an embodiment of the present subject matter, an eyelet is arranged at the base for securing a carrier basket. An eyelet allows an easy attachment of e.g. a carrier basket net or means for securing a load loaded into the carrier basket. Advantageously, the base comprises a groove. Preferably, the eyelet comprises a protrusion adapted to engage the groove. By this, an easy and reliable connection of an eyelet with the base and its groove, respectively, can be realized.

According to an embodiment of the present subject matter, the at least one member of the base is oriented in the first direction and/or cross thereto. Thus, the orientation can be adapted to the orientation of a roof rack having a cross bar. Further, the at least one member can be oriented such that the roof rack and its cross bar is mainly in parallel or cross to the cross bar positioned. By this, an easy mounting of the basket to a roof rack can be realized.

According to an embodiment of the present subject matter, the centerline of the slit of a first groove of a first transverse bar and the centerline of the slit of a second groove of a second transverse bar are positioned between two virtual parallel planes. Preferably, the distance between the two virtual parallel planes is less than 50 millimeter. Advantageously, the two virtual parallel planes are substantially parallel to a plan spanned by the base. Thus, mounting of accessories between two opposite side rails or transverse bars is reliably possible as the distance between the two transverse bars is adjusted such that mounting in a certain range is possible. This allows tolerances with regard to producing accessories as well as with regard to the attaching of accessories within the grooves.

According to an embodiment of the present subject matter, a carrier basket for an automotive vehicle preferably comprises a base having five or six members, wherein two of the members are for connecting to a roof of an automotive vehicle. Further, the carrier basket advantageously comprises a frame having two side rails oriented in a first direction and two transverse bars oriented cross to the side rails in a second direction. Preferably, the side rails are connected to the transverse bars, wherein the frame is attached upon the base as to form a box open to the top. Thus, typically the transverse bars and the side rails form side walls of the box and the basket, respectively. Further, each transverse bar can comprise a groove arranged for attachment of accessories. Advantageously, each transverse bar has a length, wherein the entire length of the grooves is available for attaching accessories, and wherein preferably the groove extends over a substantial portion of the distance between the two side rails.

According to a second aspect of the present subject matter a carrier basket net comprises a mesh and a plurality of non-elastic attachment straps for securing a load, in particular to a carrier basket.

It has to be understood that all above mentioned features of the carrier basket mentioned for the first aspect of the invention can be part and can be incorporated for the second aspect of the present subject matter.

Preferably, at least one of the plurality of attachment straps comprises a buckle for tightening tension by shorting and for releasing tension by extending the distance between two ends of the at least one of the plurality of attachment straps. Thus, the distance between the ends of at least one of the plurality of attachment straps having a buckle is variable. This means that the distance between the two ends can be shortened if a part of the at least one of the plurality of attachment straps guided through a maze of the buckle is pulled in a direction so that the distance is shortened. Further, when releasing the buckle the distance between the two ends of the at least one of the plurality of attachment straps is increased if the buckle and its mechanism, respectively, for enhancing the friction of the maze is solved such that the distance between the two ends can be increased.

According to an embodiment of the present subject matter, some of the plurality of attachment straps envelop the mesh. Thus, some of the attachment straps form a border and an edge, respectively, for the mesh, wherein the mesh extends in between the borders. Further, some of the plurality of attachment straps form preferably a rectangular shape as to form the outer shape of the mesh.

According to an embodiment of the present subject matter, at least one of the plurality of attachment straps comprising a buckle is positioned to a border and an edge, respectively, of the mesh such that a longitudinal or transversal dimension of the mesh is adaptable to a load secured with the carrier basket net. This means that by tightening or releasing tension by means of the buckle to the at least one of the plurality of attachment straps, a border and an edge of the mesh, respectively, can be exactly adapted to the shape of a load carried within a carrier basket. Thus, the shape of the mesh can be adapted to the load, and hence, the load can be easily and reliably secured with the carrier basket net.

According to an embodiment of the present subject matter, the carrier basket net further comprises at least one reinforcing attachment strap. Thus, the carrier basket net having such a reinforcing attachment strap can be strengthened so that a higher load can be secured with this carrier basket net.

Preferably, the at least one reinforcing attachment strap connects at least two corner points of the mesh or two borders and edges, respectively, of the mesh or a corner point with a border of the mesh. By this, the at least one reinforcing attachment strap extends between two borders or two corner points or a corner point and a border which means that such a reinforcing attachment strap is e.g. diagonally positioned within a rectangular shaped mesh or comprises an orientation parallel to one of the borders for example.

Preferably, the at least one reinforcing attachment strap comprises a buckle. Having such a buckle allows also for the at least one reinforcing attachment strap tightening tension by shortening and releasing tension by extending the distance between two ends of the least one reinforcing attachment strap.

According to an embodiment of the present subject matter, the mesh is an elastically sewed fabric or a rigid sewed fabric made of plastic or wire. Thus, the mesh can be easily produced and is reliable with regard to its mechanical strength comprising the above-mentioned materials. Further, production methods for such a mesh are low.

According to an embodiment of the present subject matter, at least two of the plurality of attachment straps and/or at least two reinforcing attachment straps are positioned substantially parallel and spaced apart. Thus, a regularly pattern formed by reinforcing attachment straps is positioned on a mesh. This allows an easy and reliable attachment of the mesh and the carrier basket net, respectively, to e.g. a carrier basket.

Preferably, the at least two of the plurality of attachment straps and/or at least two reinforcing attachment straps are positioned equidistant. Thus, a distance between the attachments straps and reinforcing attachments straps, respectively, is predetermined enhancing positioning and securing of a load.

According to an embodiment of the present subject matter, at least one of the plurality of attachment straps and/or at least one reinforcing attachment straps comprises an extension projecting over the border and the edge, respectively, of the mesh. Such an extension allows an easy and reliable attachment of the mesh and the carrier basket net, respectively, to e.g. a carrier basket.

Preferably, at and end of the extension an eye or a hook is arranged for engaging and securing the end to a carrier basket. Such an eye or a hook allows an easy and quick installation of the carrier basket net to a carrier basket, and thus, for securing a load within the carrier basket net in an easy and reliable way with a high mechanical strength.

Advantageously, the eye or hook is made of plastic or metal, and preferably comprises a triangular shape. Depending on the application field, the material for the eye or the hook is adapted to the mechanical forces acting on the net. Further, the triangular shape is easily realizable and easily producible, wherein such a shape comprises a high mechanical strength.

According to an embodiment of the present subject matter, the at least one reinforcing attachment strap is attached at interspaced points along the borders of the mesh. Interspaced points means that the two ends of the at least one reinforcing attachment strap are attached at the borders and the edges, respectively, of the mesh so that a tension can act on the mesh to secure e.g. a load.

According to an embodiment of the present subject matter, the plurality of non-elastic attachment straps is sewed, riveted or melted together with said mesh. The above-mentioned connections are easily realizable. Further, it is cost-effective to connect in this manner a non-elastic attachment strap to the mesh.

Preferably, the plurality of non-elastic attachment straps is connected at two points with said mesh. This enhances mechanical stability and allows to transfer a tension introduced by shortening the distance between two ends of the at least one of the plurality of attachment straps.

According to an embodiment of the present subject-matter, the buckle is a pump buckle having an open-lock mechanism so that it is openable to allow pulling the strap at various positions to release tension without interacting with the buckle. This enhances usability of the carrier basket net having such a buckle as by this a user has two free hands to work on the mesh without operating the buckle.

According to a third aspect of the present subject matter, a carrier system comprises a carrier basket for an automotive vehicle and a carrier basket net.

It has to be understood that all above mentioned features of the carrier basket mentioned for the first aspect of the invention and all above mentioned features of the carrier basket net mentioned for the second aspect of the invention can be part and can be incorporated in the third aspect of the present subject matter.

Preferably, an eye or a hook of the carrier basket net engages with an eyelet of the carrier basket for securing a load. Thus, an easy, quick and reliable connection of the carrier basket net to the carrier basket is realized. Further, due to the use of an eye/hook with an eyelet a high mechanical stability is obtained.

According to an embodiment of the present subject matter, a carrier basket net comprises preferably a mesh and a plurality of non-elastic attachment straps for securing a load, wherein typically two opposite attachment straps comprise each a buckle for tightening tension by shortening and for releasing tension by extending the distance between two ends of the attachment straps. Preferably, the attachment straps envelop the mesh so as to form a border and an edge of the mesh, respectively. Further, the two opposite attachment straps comprising each a buckle are advantageously positioned to a border of the mesh such that a longitudinal or a transversal dimension of the mesh can be adapted to a load secured with the carrier basket net. Moreover, it is preferred that the carrier basket net further comprises at least three reinforcing attachment strap, wherein the first reinforcing attachment strap can connect two corner points of the mesh, the second reinforcing attachment strap can connect two borders of the mesh, and the third reinforcing attachment strap can connect two further corner points of the mesh. Even further, the reinforcing attachment straps preferably comprise buckle for tightening tension by shortening and for releasing tension by extending the distance between two ends of the reinforcing attachment straps. Moreover, the mesh is preferably an elastically sewed fabric or a rigid sewed fabric made of plastic or wire.

BRIEF DESCRIPTION OF THE DRAWINGS

FIG. 2b shows a cross-section along IIb-IIb of FIG. 2a;

FIG. 5b shows the eyelet of FIG. 5a;

FIG. 6a shows a perspective view of a cap;

FIG. 6b shows a perspective view of FIG. 6a;

FIG. 6c shows a perspective view of two parts of the cap of FIG. 6a;

FIG. 6d shows a cross section of the cap of FIG. 6a;

FIG. 6e shows a further cross section of the cap of FIG. 6a;

FIG. 6f shows a cap of the carrier basket in a side view;

FIG. 6g shows a cap of the carrier basket in a side view;

FIG. 7 shows a perspective view of a carrier basket net; and

DESCRIPTION OF THE EMBODIMENTS

In the following an embodiment of the present subject-matter is explained based on the drawings. It is noticed that the drawings show a specific embodiment as explained below and further alternative modifications as specified in the description are at least in part not illustrated. Further, same reference signs used in the Figures denote same components.

Embodiment

Figure 1A:
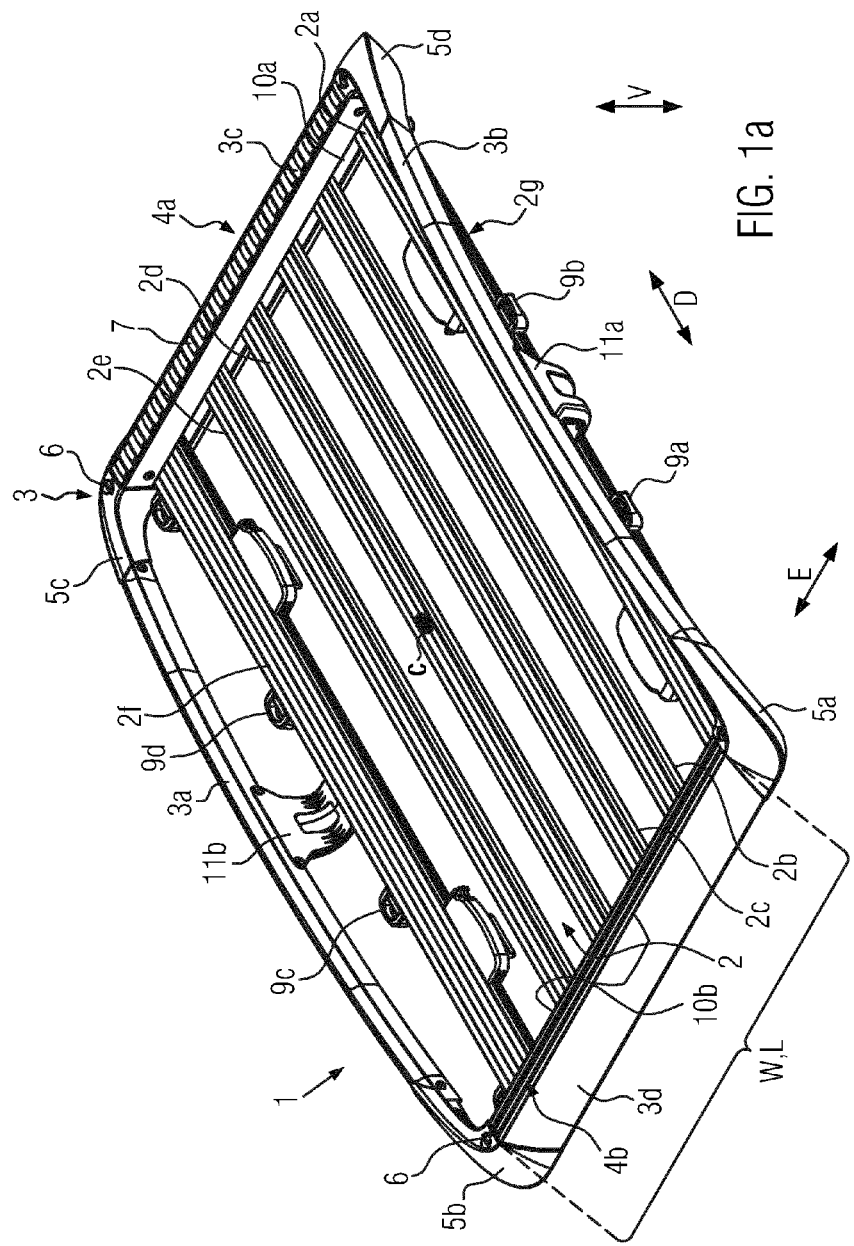
FIG. 1a shows a perspective view of a carrier basket for an automotive vehicle.

In FIG. 1a an embodiment of a carrier basket 1 for an automotive vehicle is shown. The carrier basket 1 comprises a base 2 and a frame 3.

The base 2 has six members 2a, 2b, 2c, 2d, 2e, 2f for connecting to a roof of an automotive vehicle. The six members 2a-2f are placed in a common plane to form a bottom of the box-shaped carrier basket 1. The two outer members 2a,2f comprise grooves 2g in which eyelets 9a, 9b, 9c, 9d are arranged for e.g. securing a carrier basket net 20.

The frame 3 comprises two side rails 3a, 3b oriented in a first direction D and two transverse bars 3c, 3d oriented cross to the side rails and in a second direction E, respectively. The side rails 3a, 3b are connected to the two transverse bars 3c, 3d, wherein the frame 3 is attached upon the base 2 so as to form a box open to the top. Precisely, the six members 2a-2f of the base 2 are connected to the transverse bars 3c, 3d, wherein each transverse bar comprises a slit 10a, 10b in which the longitudinal ends of the six members 2a-2f directed in the first direction D are introduced and mounted to the transverse bars 3c, 3d. The transverse bars 3c, 3d oriented in the second direction E cross to the first direction D and their longitudinal ends, respectively, are connected to the side rails 3a, 3b oriented in the first direction D and their longitudinal ends, respectively.

At the meeting points of the side rails 3a, 3b and the transverse bars 3c, 3d the carrier basket 1 comprises caps 5a, 5b, 5c, 5d, wherein each of the caps comprises a lower part 13b and an upper part 13a and a lock 6. The caps are described in detail with regard to explanations given for FIGS. 6a to 6h.

Further, both transverse bars 3c, 3d of the carrier basket 1 shown in FIG. 1a comprise a groove 4a, 4b, wherein only the groove 4b is shown as in the groove 4a a cover 7 engages and thus covers the groove 4a. The grooves 4a, 4b are arranged for attachment of accessories, e.g. for a bike carrier or a water sports equipment carrier or ski carrier.

The grooves have a length L, wherein the entire length L of the groove 4a, 4b is available for attaching accessories. Thus, the grooves 4a, 4b extend over a substantial portion of the distance between the two side rails 3a, 3b.

As further shown in FIG. 1a the grooves 4a, 4b extend between the two side rails 3a, 3b along the entire width W of the two transverse bars 3c, 3d. The two side rails 3a, 3b and the two transverse bars 3c, 3d are displaced to the base 2 in a vertical direction V such that the base 2 forms a bottom of a box and the side rails 3a, 3b plus the transverse bars 3c, 3d build sidewalls of the box. Hence, a box is made similar to a basket having a bottom and four side walls, wherein the basket is open to the top allowing the placement of for example accessories.

The transverse bar 3c comprises a cover 7 engaging the groove 4a—as mentioned above—for closing the groove of the transverse bar 3c outwardly. The cover 7 is positioned upon and covers, respectively, substantially the whole flat surface of the transverse bar 3d directed upwardly. Onto this upwards directed surface, the cover 7 is arranged having a profile with protrusions 7a for reducing noise of air turbulences. Of course, it is possible that a further cover 7 is positioned within the groove 4b of the transverse bar 3d.

Further, in FIG. 1a the grooves 4a, 4b of the transverse bars 3c, 3d face upwards in the vertical direction V. Thus, fixing of accessories upon the transverse bars 3c, 3d is possible. By this, mounting a bike carrier or a water sports equipment carrier or ski carrier engaging the provided grooves 4a, 4b of the carrier basket 1 is possible. Further, it is also possible that the two grooves 4a, 4b of the two transverse bars 3c, 3d face each other. This allows also the attachment of accessories.

Further, it is possible that the transverse bars 3c, 3d comprise a groove facing upwards and a groove facing another groove of another transverse bar, preferably positioned opposite. Thus, it is possible that a groove of the transverse bar 3c faces a groove of the transverse bar 3d so that the slits of the grooves are directed into the center C of the carrier basket 1.

Figure 1B:
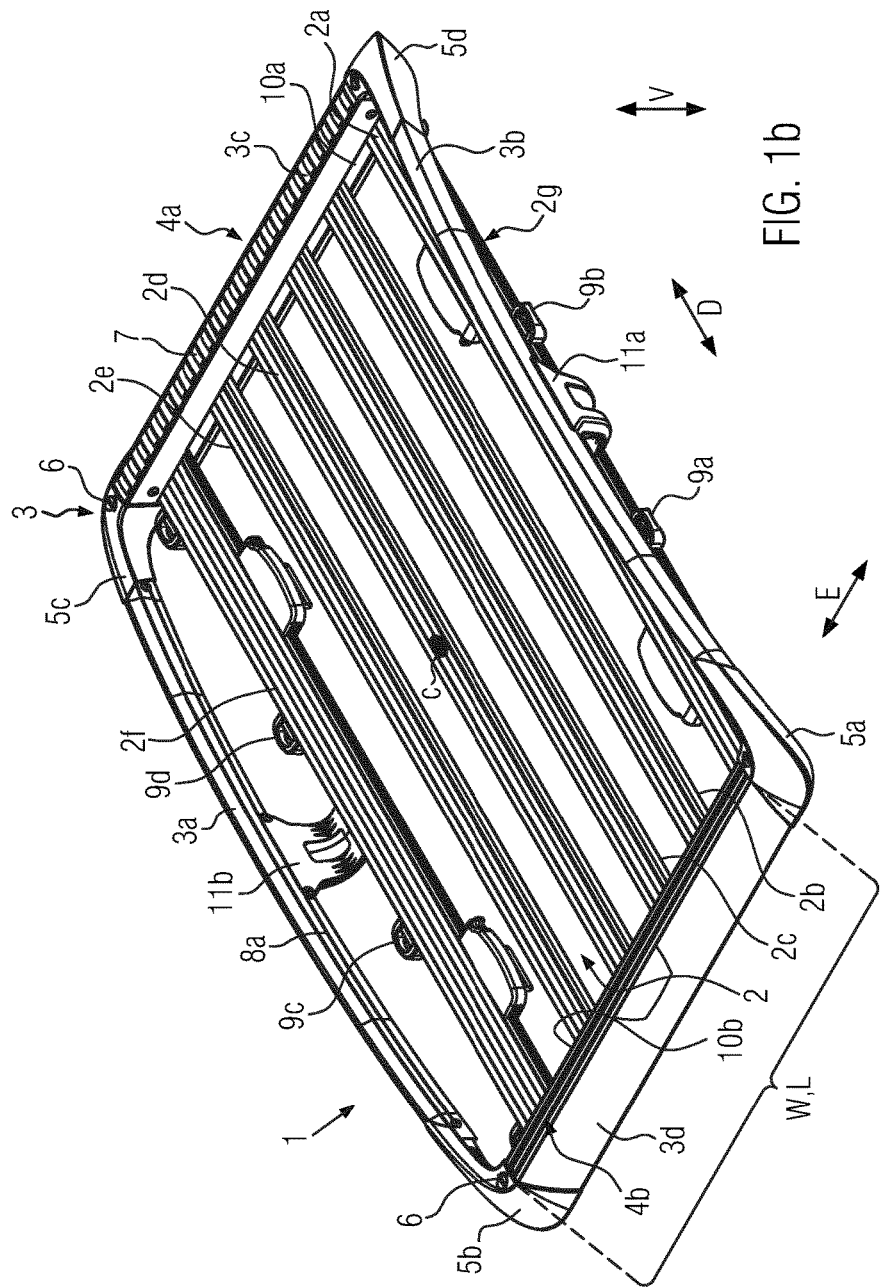
FIG. 1b shows an embodiment in a perspective view of a carrier basket for an automotive vehicle.

Referring to FIG. 1b which is similar to FIG. 1a shows a further embodiment, but here each side rail 3a, 3b comprises a further groove 8a, 8b. Also these grooves allow an attachment of accessories. The further grooves 8a, 8b of each side rail 3a, 3b are oriented into the center C of the carrier basket 1. Thus, the grooves 8a, 8b face each other. Hence, it is possible to attach an accessory on both side rails 3a, 3b having the aforementioned grooves. The grooves 8a, 8b are optional.

Not shown in the Figures but similar to the embodiment of FIG. 1a or 1b, in a further embodiment it is preferred that the grooves 8a, 8b of the side rails 3a, 3b and the grooves of the transverse bars 3c, 3d are connected. Thus, it is possible that the grooves 8a, 8b of the side rails 3a, 3b are arranged facing upwards similar to the grooves 4a, 4b shown in FIG. 1. Further, it is possible that the grooves 4a, 4b of the transverse bars 3c, 3d and the further grooves 8a, 8b of each side rail 3a, 3b are oriented into the center C of the carrier basket 1.

Of course, it is possible that the side rails 3a, 3b as well as the transverse bars 3, 3d each comprises two grooves, one facing to the center C of the basket and one facing upwards in the vertical direction V. In this context, it is preferred, that the grooves 8a, 8b of the side rails 3a, 3b and the grooves 4a, 4b of transverse bars 3c, 3d are connected so that a circulating groove is obtained circulating on the inside of the sidewalls and the frame, respectively, of the box open to the top.

Figure 2A:
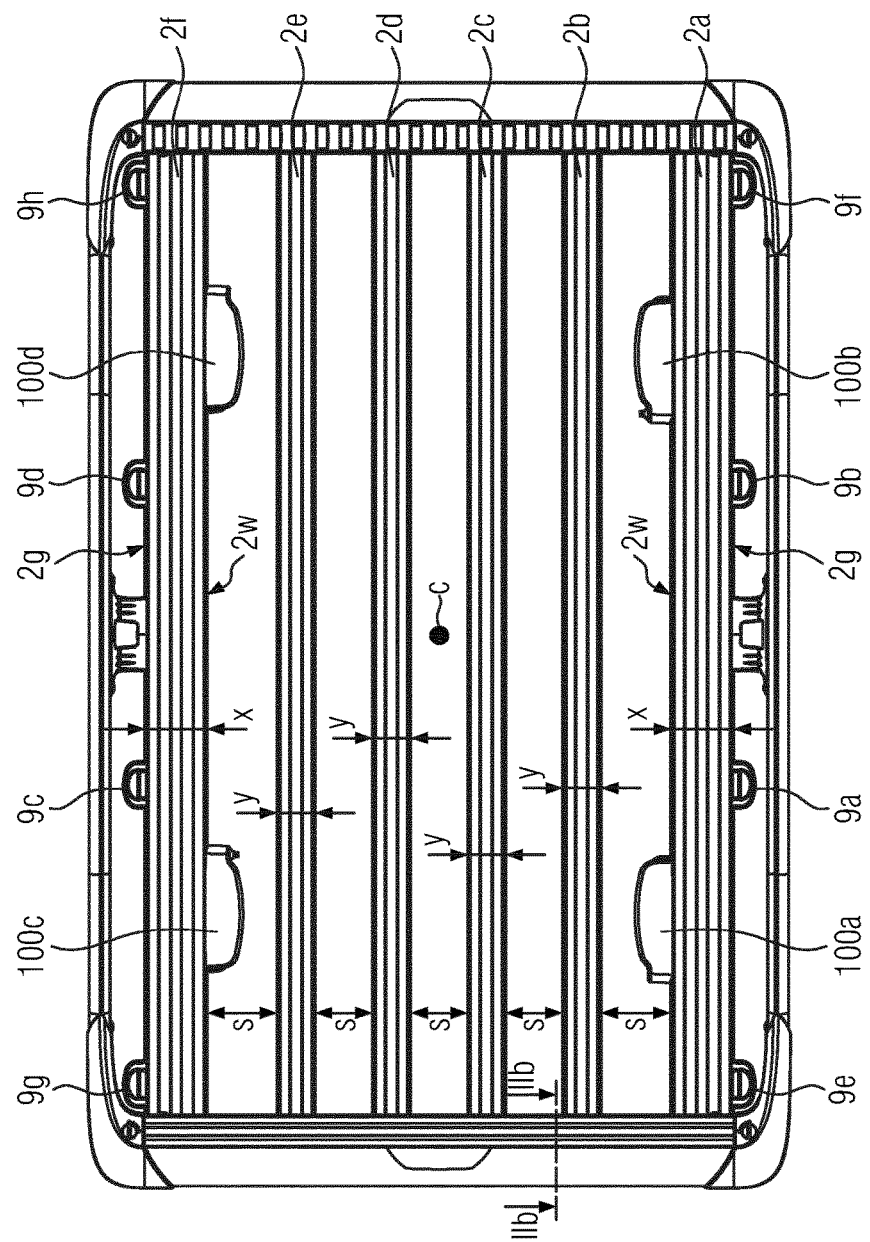
FIG. 2a shows a plan view of the topside of the carrier basket of FIG. 1.

FIG. 2a shows a plan view of the topside of the carrier basket 1 of FIG. 1a. Here, the outermost members 2a and 2f of the base 2 comprise a width X which is broader than the width Y of each of the members 2b, 2c, 2d, 2f. The width X of the member 2a is similar to the width X of the members 2f. Same applies for the width Y of the members 2b, 2c, 2d, 2e. Their width Y is also similar. The distance S between the six members is uniform so that e.g. the space between the members 2a and 2b is equal to the space between 2d and 2f. The distance S between two members is measured between two ends of the members facing each other—as can be seen in FIG. 2. It is also possible that the distance between each member varies.

Further, the members 2b to 2e comprise each a profile for mechanically stabilizing each member. Even further, the members 2a and 2f also comprise further grooves 2g, 2w positioned at the side and directed outwards and inwards, respectively, from the carrier basket 1. Thus, the grooves 2g face away from the center C of the carrier basket 1, wherein the grooves 2w are directed to the center C.

Figure 2B:
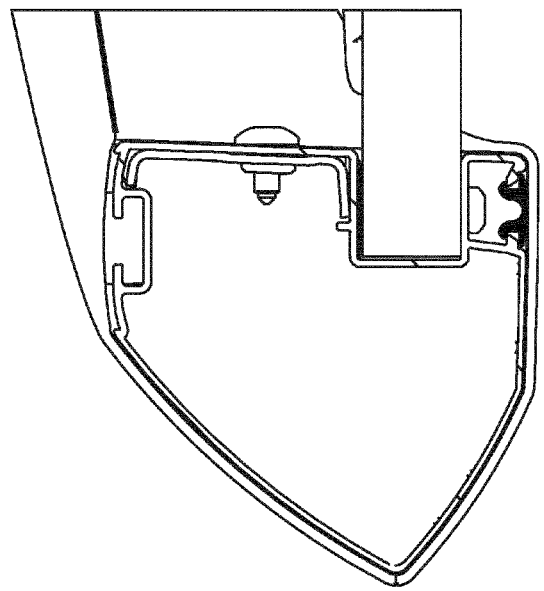

In FIG. 2b a cross-section along lines IIb-IIb of FIG. 2a is shown. Here, the T-track and the groove 4b, respectively, of the transverse bar 3d is shown, wherein also the hollow profile of the bar 3d is depicted. The T-track and the groove 4b, respectively, are adapted to be engaged by a counterpiece having a T-screw for example.

Figure 3:
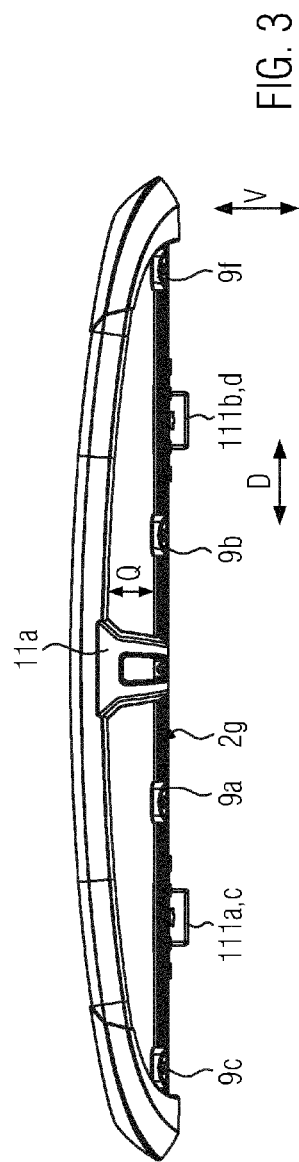
FIG. 3 shows a side view of the carrier basket of FIG. 1.

FIG. 3 shows a side view of the carrier basket 1 of FIG. 1a. As can be seen in FIG. 1a, 1b and FIG. 3 the side rails 3a, 3b comprise a bended shape, wherein the ends of the side rails 3a, 3b are lower in the vertical direction V in comparison to the highest point in the middle of the side rails 3a, 3b. For mechanical stability the middle of the bended side rails 3a, 3b is supported by distance means 11a, 11b spanning the distance Q between the highest point of the side rail 3a, 3b and the base 2.

As can be seen in FIGS. 1a, 1b and 2a, eyelets 9a, 9b, 9c, 9d, 9e, 9f, 9h are positioned in the grooves 2g such that the eyelets 9a-9h are directed outwards and face away from the center C of the carrier basket 1, respectively. The arrangement of the eyelets in the grooves can be better understood with regard to FIG. 5a, described below.

Further, in FIGS. 1a, 1b and 3 the distance means 11a, 11b connecting the highest point of the side rails 3a, 3b with the members 2a and 2f, respectively, engage the grooves 2g of the members 2a and 2f from the outside. The end opposite to the end engaging the groove 2g is mounted to the side rails 3a, 3b, wherein this mounting can be realized—as depicted in FIG. 1b—by engaging the groove 8a of the side rail 3a or by screwing together the distance means 11a, 11b with the side rail 3a, 3b—as depicted in FIG. 1a.

Referring to FIG. 2a, the grooves 2w of the members 2a and 2f are directed to the center C of the carrier basket 1 in which connecting means 100a, 100b, 100c, 100d are arranged. These connecting means 100a-100d protrude—with regard to FIG. 3—from the bottom of the carrier basket 1 to a downside. The means comprise a holder 111a, 111b, 111c, 111d which can encircle a cross bar mounted to a roof of a vehicle. In this way, the carrier basket 1 is attachable to a roof of a vehicle so as to hold the carrier basket 1 in place and to transfer forces acting on the carrier basket 1 to the roof of a vehicle.

Figure 4:
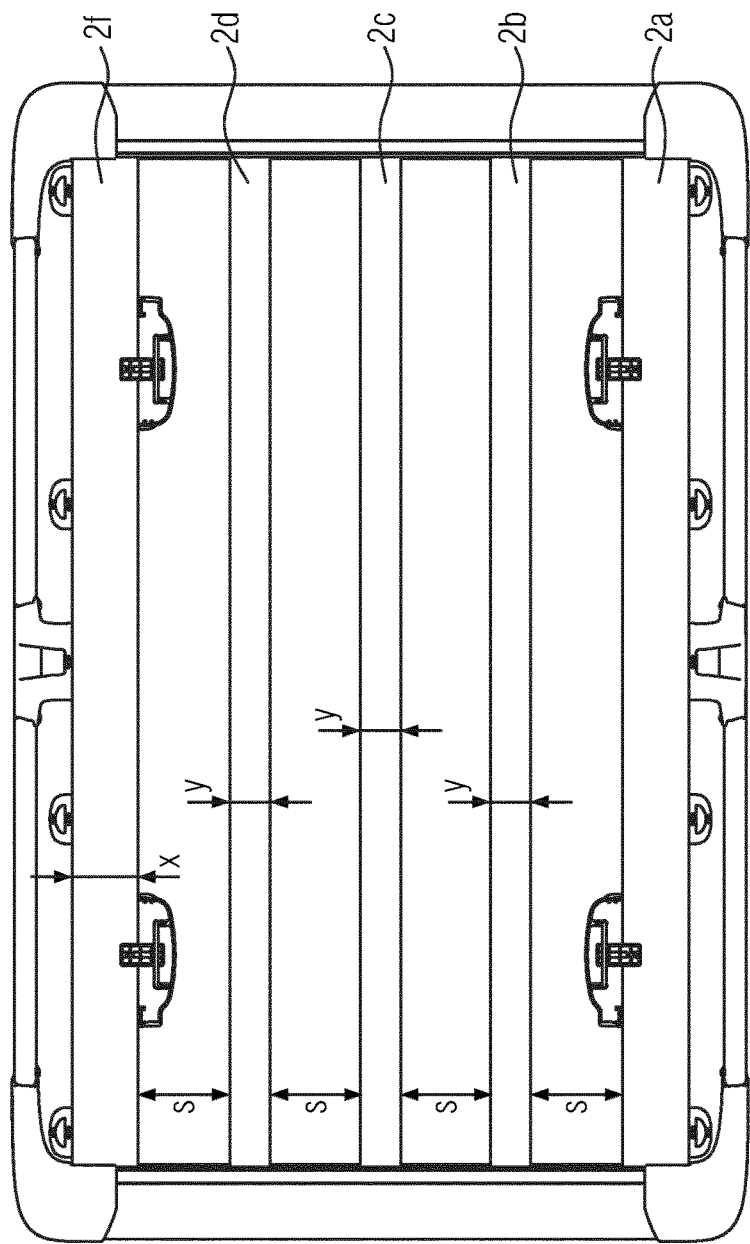
FIG. 4 shows a rear side of a carrier basket according to an embodiment.

FIG. 4 shows a rear side of an embodiment of a carrier basket 1 which is mainly identical to the carrier basket shown in FIGS. 1a, 1b to 3, but comprises instead of six members of the base 2 five members. This means that there are two outer members 2a and 2f but only three inner members 2b, 2c, 2d. Nevertheless, the distance S and the space, respectively, between the members 2a, 2b, 2c, 2d, 2f of the base 2 is also—as already discussed above with regard to FIG. 2a—equal, mainly identical and equidistant, respectively. But, it is also possible that the distance between each member varies. Further, also the width X of the members 2a and 2f is different to the width Y of the members 2b to 2e. Whereas the widths of the members shown in FIG. 2a differs from the widths of the members shown in FIG. 4.

Figure 5A:
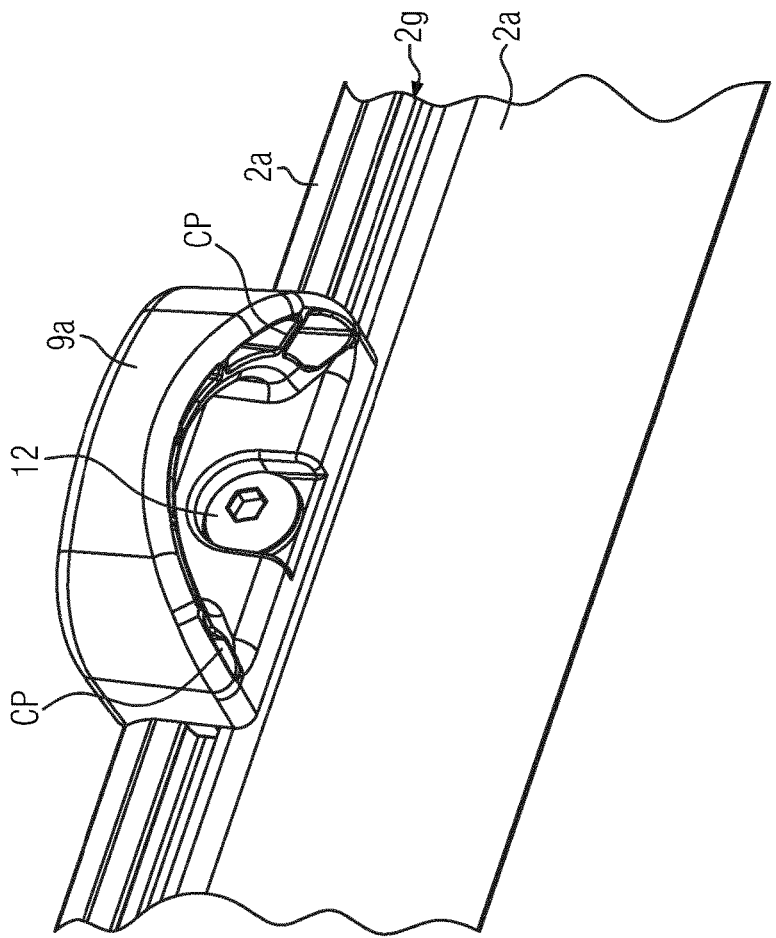
FIG. 5a shows an eyelet mounted to the carrier basket in a three-dimensional view.

FIG. 5a shows an enlarged view of the eyelet 9a mounted to the carrier basket 1 in a three-dimensional view. The eyelet 9a is exemplarily explained for all further eyelets 9b-9h. The eyelet 9a is hold and guided, respectively, in the groove 2g of the member 2a. As can be seen, a screw 12 fixes the eyelet 9a to the groove 2g and the member 2a, respectively. When releasing the screw force of clamping the eyelet 9a to the member 2a and the groove 2g, respectively, the eyelet 9a can be displaced along the groove 2g. Thus, the position of the eyelet 9a relative to the member 2a is variably adjustable.

Figure 5B:
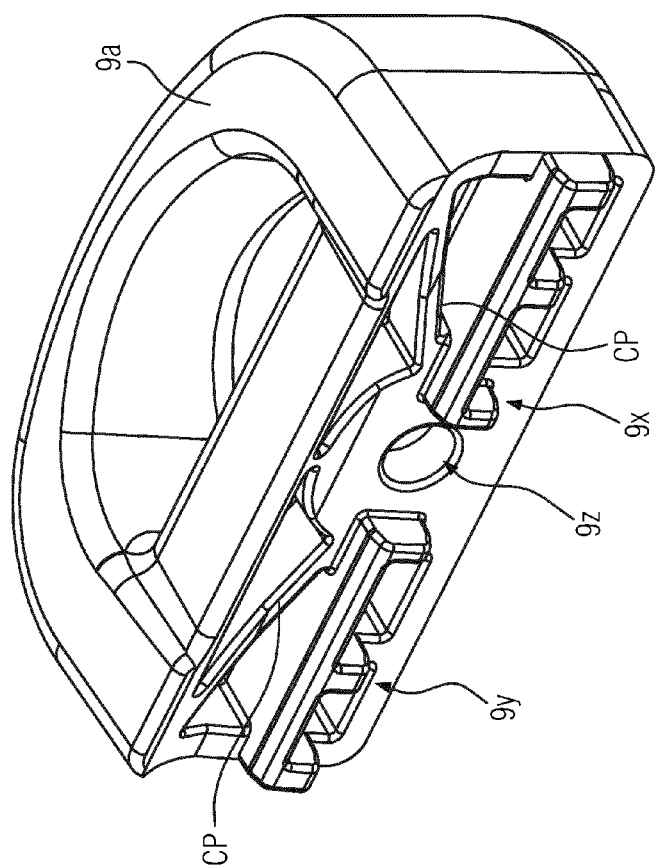

FIG. 5b shows the eyelet 9a of FIG. 5a. The eyelet comprises protrusions 9x and 9y for engaging the groove 2g of the member 2a. Further, a through hole 9z is shown in which the screw 12 shown in FIG. 5a can be inserted. Further, with regard to FIG. 5b as well as FIG. 5a several cavities are shown in which cross pieces CP are arranged for enhancing the mechanical stability. The cavities further enhance the weight of the eyelet and save material, so that production costs can be reduced.

FIG. 6a shows an enlarged view of the cap 5a of the carrier basket 1. The cap 5a is exemplarily explained for all further caps 5b, 5c, 5d. At the cap 5a the transverse bar 3d meets the side rail 3b. The cap 5a comprises an upper part 13a and a lower part 13b. As can be seen in this Figure, the cover 7 comprises protrusions 7a as already mentioned before with regard to FIG. 1a. Moreover, also members 2a-2d are shown.

Figure 6B:
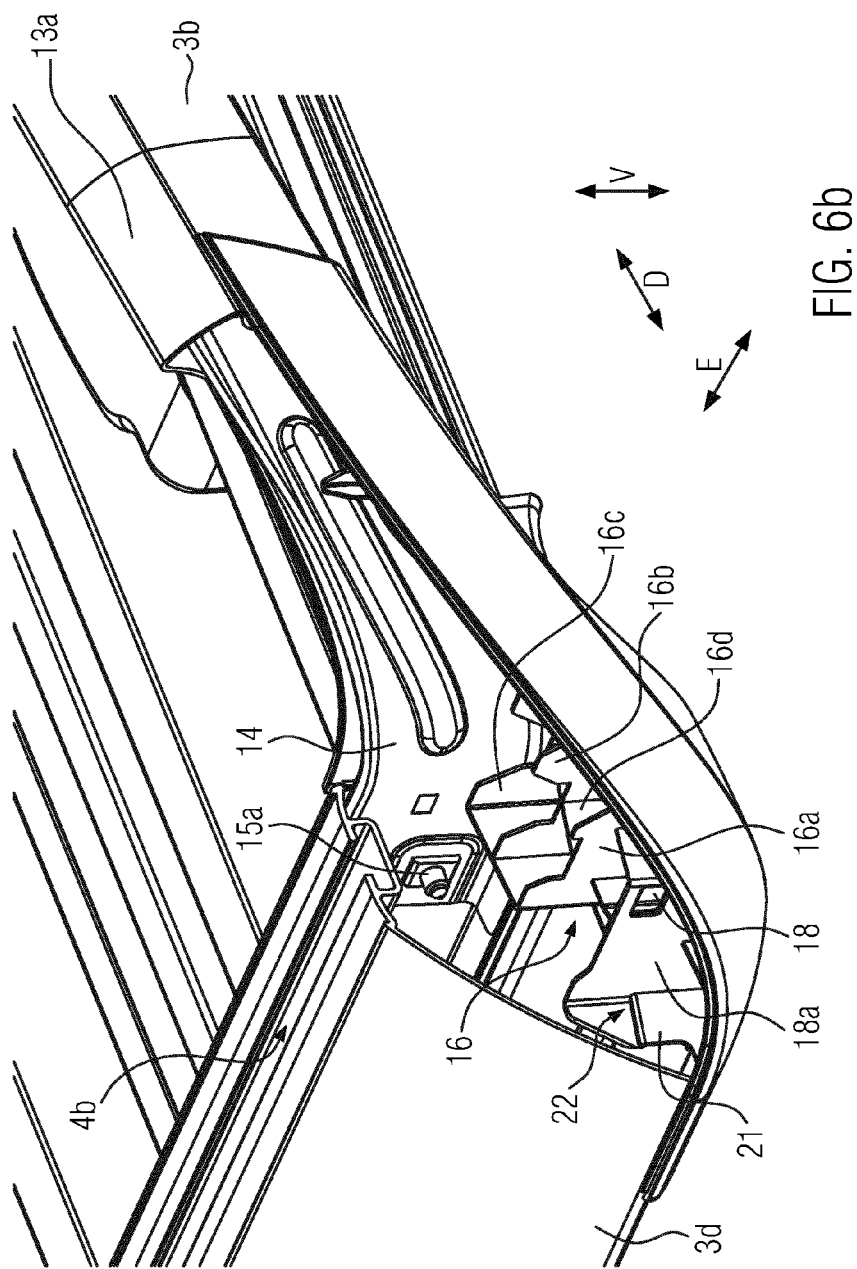

FIG. 6b shows an enlarged view of the cap 5a of the carrier basket 1, wherein the upper part 13a of the cap 5a is taken away so that the inside of the cap 5a and the connection between the side rail 3b and the transverse bar 3d can be seen.

The transverse bar 3d is depicted without the cover 7 (see FIG. 1) so that the groove 4b is visible. The groove 4b comprises a T-track. Further, the transverse bar 3d has a hollow profile. Also the side rail 3b comprises a hollow profile. Both profiles comprise a side part directed to the center C of the carrier basket 1. To each of said side parts of the transverse bar 3d and the side rail 3b a connecting member 14 is mounted inwards the profile.

The connecting member 14 comprises a bended shape so as to connect the inside of the side parts of the hollow profiles of the transverse bar 3d and the side rail 3b. The connecting member 14 comprises a shape is similar to "L". The connecting member 14 is mounted to the side rail 3b and the transverse bar 3d via screws 15a, 15b, wherein the member 14 is made of aluminum.

Figure 6C:
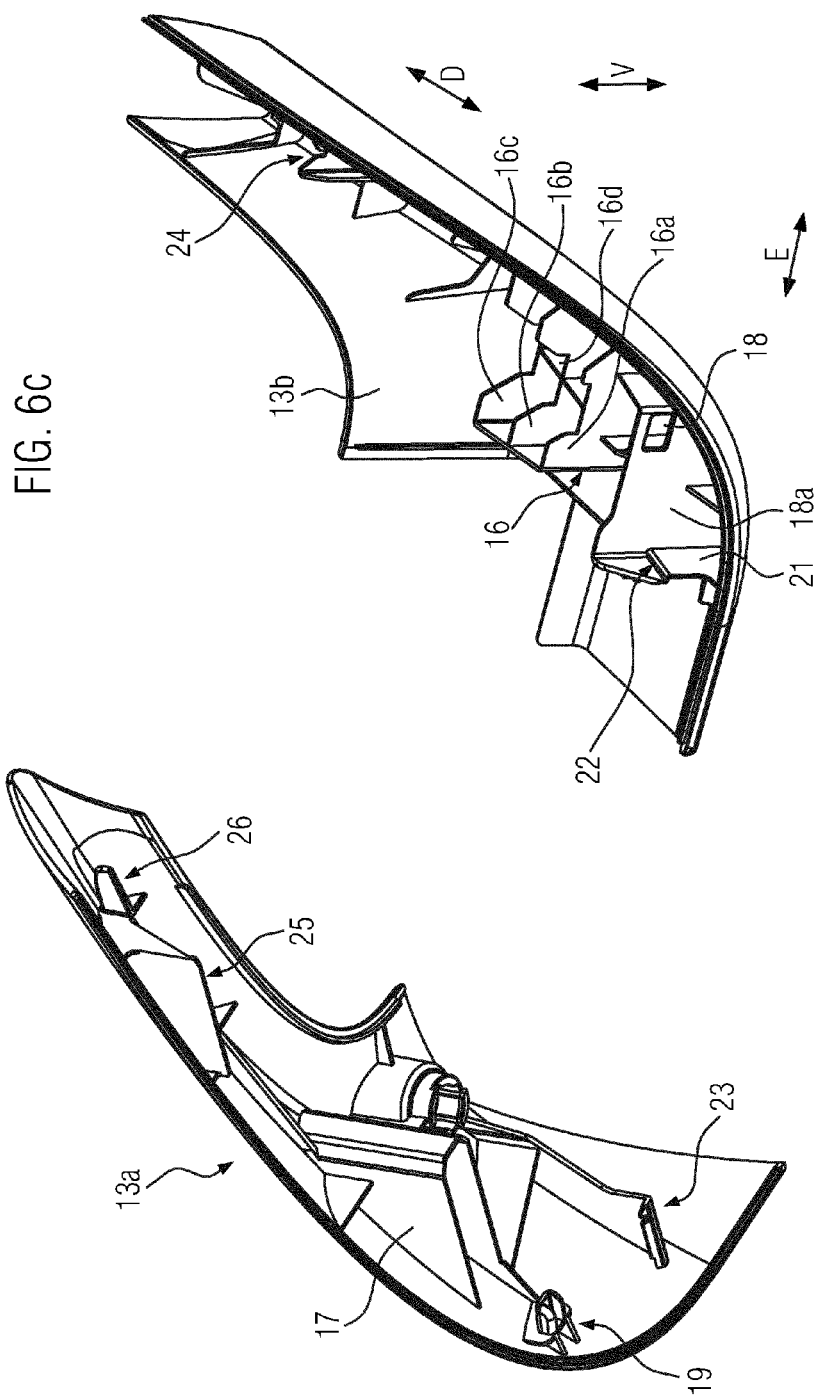

A guide 16 is depicted in FIG. 6b and FIG. 6c which comprises four reinforcing rips 16a, 16b, 16c, 16d. The guide is integrally molded with the lower part 13b of the cap 5a, wherein the guide as well as further reinforcing rips and protrusions within the lower part 13b enhance stability of the lower part. While the connecting member 14 is connected to the transverse bar 3d and the side rail 3b via screws 15a, 15b, the lower part 13b is connected to the connecting member 14 via screws 20—see FIG. 6g.

The reinforcing rip 16d forms a bottom of the guide 16 and is arranged in the first direction D. The reinforcing rips 16a, 16b, 16c are directed in the second direction E and spaced to each other in the first direction D. Thus, the reinforcing rip 16d is mainly perpendicular to the three reinforcing rips 16a, 16b, 16c.

Further, the cross reinforcing rips 16a, 16b, 16c are "U"-shaped, wherein the width from "U" to "U" gets smaller. By this, a cone-shaped guide and glide, respectively, is formed, wherein the cross reinforcing rips 16a-16c and their "U"-shape, respectively, form sidewalls. Further, the reinforcing rip 16d descends from cross reinforcing rip to cross reinforcing rip, wherein the three rips 16a, 16b, 16c are arranged in a row and spaced to each other in the first direction D. The aforementioned arrangement of the four reinforcing rips 16a-16d is adapted to guide a mating component 17 on the upper part 13a of the cap 5a easily into its position shown in FIG. 6a. Due to this arrangement of rips a stabilization of the upper part 13a with regard to a movement in the second direction E is obtained, wherein a sliding movement of the upper part 13a relative to the lower part 13b in the first direction D is possible.

Figure 6E:
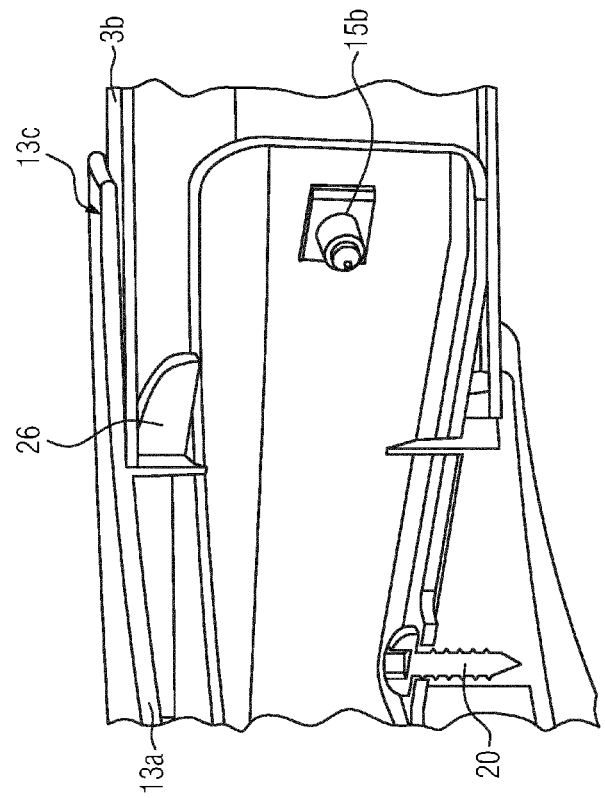
Figure 6D:
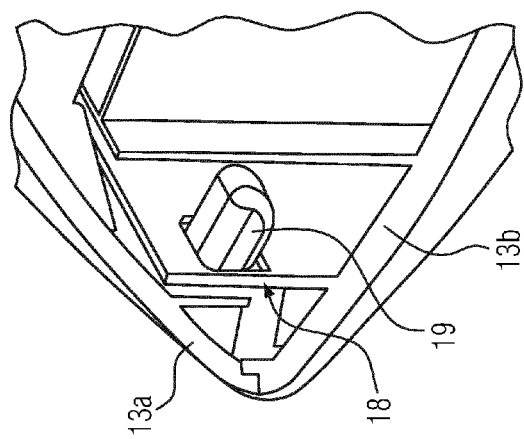

Referring to FIGS. 6c and 6d, the lower part 13b of the cap 5a comprises a hole 18 in an additional reinforcing rip 18a for stabilizing the upper part 13a. Further, the upper part 13a comprises a protrusion 19—as depicted in FIGS. 6d and 6c—for engaging the hole 18. The protrusion 19 limits the relative movement of the upper part 13a of the cap 5a to the lower part 13b on the side of the transverse bar 3d.

For further enhancing the mechanical stability, the lower part 13b comprises a reinforcing rip 21 and wall, respectively, extending in the first direction D and originating from the additional reinforcing rip 18a (see FIG. 6c). The rip 21 comprises a crank 22 adapted to engage with a hook 23 formed on the inside of the upper part 13a of the cap 5a. Further, the lower part 13b comprises a base 24 supporting a protrusion 25 having a shape similar to a reinforcing rip wherein the protrusion is formed on the inside of the upper part 13a of the cap 5a.

With regard to FIG. 6e, on the inside of the upper cap part a nose 26 is installed such that the profile of the side rail 3b can be engaged between the nose 26 and an outer wall 13c of the upper part 13a. Thus, the protrusion 19 engages the hole 18 on one end of the cap 5a and the nose 26 together with the outer wall 13c of the upper part 13a of the cap 5a engages the profile of the side rail 3b. Thus, both ends of the cap 5a are securely hold in place. Hence, the whole cap 5a and the upper part 13a, respectively, is fixed to the lower part 13b and the carrier basket 1, respectively.

Due to the aforementioned parts of the upper and lower part 13a, 13b of the cap 5a a reliable and stable connection of the upper part can be realized, wherein the cap 5a is removably positioned at an end of the transverse bar 3d. Further, it is possible that the caps 5a to 5d comprise a shape adapted for engaging the groove. This is another solution for connecting the cap with carrier basket 1.

FIGS. 6f and 6g show two positions, wherein the first position of FIG. 6f shows the moving direction of the upper part 13a for engaging the lower part 13b of the cap 5a. In FIG. 6g, the upper part 13a is engaged with the lower part 13b of the cap 5a.

Figure 6H:
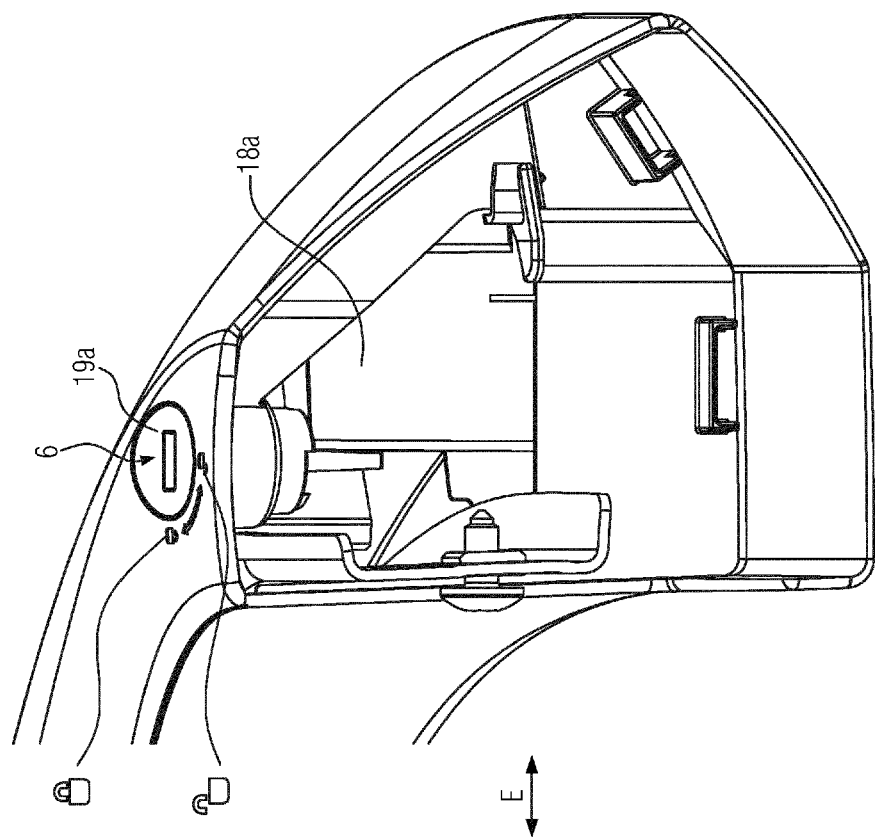
FIG. 6h shows a lock of a cap.

In FIG. 6h the upper part 13a is seen-through and it is shown that a locking cylinder 19a engages and locks behind the additional reinforcing rip 18a of the lower part 13b. Thus, sliding the upper part 13a in a direction opposite to that shown in FIG. 6f is prevented, which means that movement along the second direction E is restricted. Hence, unauthorized access to the grooves 4a, 4b is prevented.

FIG. 7 shows a carrier basket net 20 having a mesh 21 and a plurality of non-elastic attachments straps 22a, 22b, 22c, 22d for securing a load in particular to a carrier basket 1. Some of the plurality of attachments straps 22a, 22d—as can be seen in FIG. 7—comprise a buckle 23a, 23b for tightening tension by shortening and for releasing tension by extending the distance between two ends of some of the plurality of attachment straps 22a-22d.

As can be seen in FIG. 7, the mesh is mainly rectangular shaped, wherein non-elastic attachment straps 22a, 22b, 22c, 22d envelope the mesh 21. The attachment straps 22a and 22c comprise each a buckle 23a and 23b, respectively, so as to shorten the distance of the corner points P1 to P2 and P3 to P4. Thus, in a transverse direction T the mesh can be adapted by the buckles 23a, 23b and the attachment straps 22a, 22c, respectively. The attachment straps 22a to 22d form a border 24a to 24d of the mesh 21 such that a longitudinal or a transversal direction L, T of the mesh 21 is adaptable to a load secured with the carrier basket net 20.

Further, the carrier basket net 20 comprises reinforcing attachment straps 25a, 25b, 25c, 25d, 25e which connect to corner points P1, P2, P3, P4 of the mesh 21 or to borders 24a, 24b, 24c, 24d of the mesh 21 or a corner point P1 to P4 with a border 24a to 24d of the mesh 21. As can be further seen in FIG. 7, the reinforcing straps 25a, 25b, 25c, 25d comprise each two buckles, wherein the reinforcing strap 25e oriented substantially parallel to the longitudinal direction L comprises no buckle.

The buckles 23c to 23j are all fixed to the reinforcing straps such that the distance between the buckle and an outer end connected to the attachment straps 22a to 22d can be shortened or extended as a free end of the reinforcing straps is guided through a maze of the buckle.

More precisely, each reinforcing strap comprises two parts, a fixed one mounted to the mesh and an extension 26a, 26b, 26c, 26d, 26e, 26f, 26g, 26h relatively movable to the mesh 20, wherein each extension projects over the borders 24a to 24d of the mesh 21. The fixed part is mounted to the buckle, wherein the movable extension is guided through a maze of the buckle. At the end of the extension 26a to 26h an eye 27a to 27h is arranged for engaging and securing, respectively, the end to a carrier basket 1. At each end of the extension 26a-26h a hook 27a-27h is installed for e.g. engaging with an eyelet 9a-9f of a carrier basket 1.

The eye is made of metal and comprises a triangular shape, wherein the mesh is an elastically sewed fabric, wherein it is possible that the mesh is a rigid sewed fabric made of plastic or wire.

The reinforcing straps 25a, 25b, 25c, 25d, 25e are positioned substantially parallel and spaced apart such that the reinforcing straps are positioned equidistant along the longitudinal dimension L at the borders 24b and 24d. Further, the reinforcing attachment straps 25a to 25e are attached at interspaced points along the borders 24a to 24d of the mesh 21.

In an embodiment the buckle 23a-23h of the carrier basket net 20 is a pump buckle having an open-lock mechanism so that it is openable to allow pulling the strap and the extension, respectively, at various positions to release tension without interacting with the buckle 23a-23h.

Figure 8:
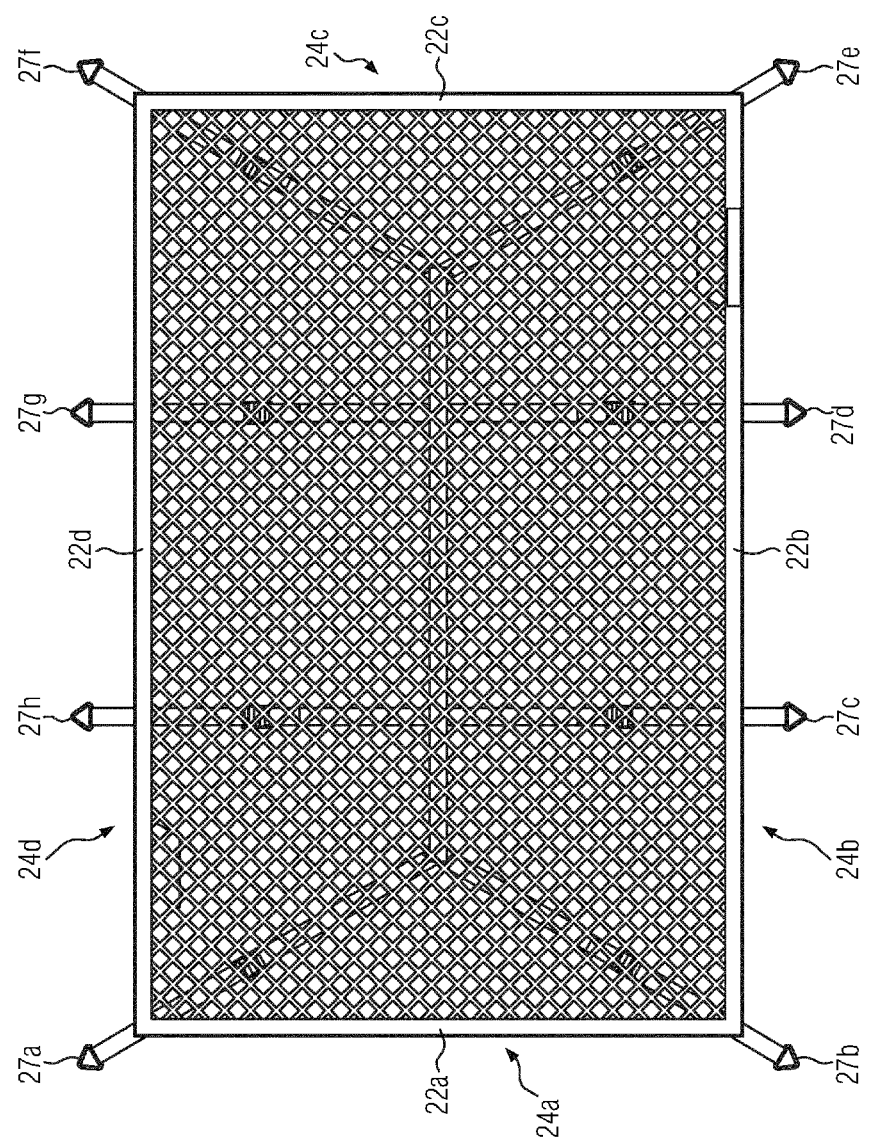
FIG. 8 shows a bottom view of the carrier basket net.

FIG. 8 shows a bottom view of the carrier basket net 20 of FIG. 7. As can be seen, the reinforcing straps 25a, 25b, 25c, 25d, 25e are attached on one side of the mesh.

Further, by assembling the carrier basket 1 for an automotive vehicle with the carrier basket net 20, the hooks 27a-27h of the carrier basket net 20 engage with the eyelets 9a-9d of the carrier basket 1 for securing a load.

The invention claimed is:

1. A carrier basket for an automotive vehicle, comprising:
a base having at least one member configured to connect to a roof of an automotive vehicle; and
a frame having two side rails oriented in a first direction and at least one transverse bar oriented cross to the side rails,
wherein the side rails are connected to the at least one transverse bar,
wherein the frame is attached upon the base forming a box open to the top,
wherein the at least one transverse bar comprises a groove configured for attachment of accessories and having a length,
wherein the entire length of the groove is configured for attaching accessories,
wherein the groove extends over a portion of the distance between the two side rails, and wherein the groove is exposed at a distal end of the at least one transverse bar when the at least one transverse bar is connected to the side rails.

2. The carrier basket according to claim 1, wherein the groove extends between the two side rails along the entire length of the at least one transverse bar.

3. The carrier basket according to claim 1, wherein the carrier basket further comprises at least one cap configured to close an end of the groove, wherein the at least one cap is removably positioned at an end of the at least one transverse bar.

4. The carrier basket according to claim 3, wherein at least one cap comprises a lock configured to lock the at least one cap at an end of the groove, wherein the lock engages with cooperating means in the at least one cap or engages with the side rails or the at least one transverse bar, wherein the cooperating means are arranged at a lower part of the cap.

5. The carrier basket according to claim 1, wherein the carrier basket further comprises a cover, wherein the cover engages the groove to close the groove of the at least one transverse bar outwardly, wherein the cover substantially covers a surface of the at least one transverse bar, and wherein the cover provides a profile having protrusions for reducing noise of air turbulences.

6. The carrier basket according to claim 1, wherein the groove is a T-track.

7. The carrier basket according to claim 1, wherein at least one of the side rails, the at least one transverse bar, and the at least one member are made of aluminum, metal, carbon fiber or a compound, and wherein the at least one cap is made of plastic.

8. The carrier basket according to claim 1, wherein the groove faces upwards, or wherein two grooves of two transverse bars face each other.

9. The carrier basket according to claim 1, wherein the base forms a bottom of the box and the side rails and the at least one transverse bar form side walls of the box.

10. The carrier basket according to claim 1, wherein each side rail comprises a second groove, wherein the second groove of the side rails and the at least one transverse bar are connected, and wherein the second groove of each side rail and the groove of the at least one transverse bar are oriented into the center of the carrier basket.

11. The carrier basket according to claim 1, wherein an eyelet is arranged at the base and configured to secure a carrier basket net, and wherein the base comprises a groove.

12. The carrier basket according to claim 1, wherein the at least one member of the base is oriented in the first direction or cross thereto.

13. The carrier basket according to claim 1, wherein a centerline of a slit of a first groove of a first transverse bar and a centerline of a slit of a second groove of a second transverse bar are positioned between two virtual parallel planes, wherein a distance between the two virtual parallel planes is less than 50 millimeters, and wherein the two virtual parallel planes are substantially parallel to a plane spanned by the base.

14. The carrier basket of claim 1, wherein the at least one transverse bar has a hollow profile and a side rail has a hollow profile.

15. The carrier basket of claim 14, further comprising a connecting member disposed within and connecting the hollow profiles of the at least one transverse bar and the side rail.

* * * * *